United States Patent
Imanaka et al.

(10) Patent No.: US 9,263,957 B2
(45) Date of Patent: Feb. 16, 2016

(54) SWITCHING POWER SUPPLY CIRCUIT AND LED ILLUMINATION DEVICE

(71) Applicant: SHARP KABUSHIKI KAISHA, Osaka-shi, Osaka (JP)

(72) Inventors: Hideyuki Imanaka, Osaka (JP); Toshiya Fujiyama, Osaka (JP); Ryohta Takahashi, Osaka (JP); Yasuo Kudara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/384,342

(22) PCT Filed: Mar. 22, 2013

(86) PCT No.: PCT/JP2013/058261
§ 371 (c)(1),
(2) Date: Sep. 10, 2014

(87) PCT Pub. No.: WO2013/146580
PCT Pub. Date: Oct. 3, 2013

(65) Prior Publication Data
US 2015/0048755 A1 Feb. 19, 2015

(30) Foreign Application Priority Data

Mar. 26, 2012 (JP) .................................. 2012-069664

(51) Int. Cl.
*H02M 3/335* (2006.01)
*H05B 33/08* (2006.01)
*H02M 1/00* (2007.01)

(52) U.S. Cl.
CPC ............ *H02M 3/33515* (2013.01); *H02M 1/00* (2013.01); *H02M 3/33507* (2013.01); *H05B 33/0815* (2013.01); *H02M 2001/0012* (2013.01); *H02M 2001/0025* (2013.01)

(58) Field of Classification Search
CPC ............. H02M 2001/0012; H02M 2001/0025; H02M 3/33515; H02M 3/33507; H05B 33/0815

USPC ............ 315/219, 291, 307; 363/21.12, 21.16, 363/21.01, 21.13, 21.17, 21.18, 21.15

See application file for complete search history.

(56) References Cited

U.S. PATENT DOCUMENTS 7,116,564 B2 * 10/2006 Takahashi ......... H02M 3/33523
363/21.12
7,723,964 B2 * 5/2010 Taguchi .............. H02M 1/4225
323/222

(Continued)

FOREIGN PATENT DOCUMENTS

JP 59-50772 A 3/1984
JP 4-108386 A 4/1992

(Continued)

*Primary Examiner* — Minh D A
*Assistant Examiner* — Borna Alaeddini
(74) *Attorney, Agent, or Firm* — Birch, Stewart, Kolasch & Birch, LLP

(57) ABSTRACT

A flyback-type switching power supply circuit provided with a transformer including a primary coil and a secondary coil, and a switching element connected to the primary coil, comprising: a multiplying circuit for multiplying a first value obtained by multiplying the on-duty ratio of a secondary current flowing to the secondary coil by a predetermined first constant, and a second value obtained by multiplying the peak value of a primary current flowing to the primary coil by a predetermined second constant; and a switching control circuit for controlling switching of the switching element so that the result of multiplication by the multiplying circuit and a third value obtained by multiplying a reference voltage by a predetermined third constant match; and the flyback-type switching power supply circuit is configured so that at least one of the first constant, the second constant, and the third constant is variable by an external signal.

20 Claims, 12 Drawing Sheets

(56) References Cited

U.S. PATENT DOCUMENTS

| | | | | |
|---|---|---|---|---|
| 8,130,516 | B2* | 3/2012 | Komatsu | H02M 3/33507 363/21.08 |
| 8,213,194 | B2* | 7/2012 | Koutensky | H02M 3/33523 315/209 R |
| 2009/0001954 | A1* | 1/2009 | Morota | H02M 3/33507 323/282 |
| 2009/0268488 | A1 | 10/2009 | Fujii | |
| 2010/0309690 | A1* | 12/2010 | Kawabe | H02M 3/33507 363/21.01 |
| 2013/0215649 | A1* | 8/2013 | Huang | H02M 3/33523 363/21.17 |

FOREIGN PATENT DOCUMENTS

| | | |
|---|---|---|
| JP | 2005-86886 A | 3/2005 |
| JP | 2009-11073 A | 1/2009 |
| JP | 2009-268316 A | 11/2009 |
| JP | 2010-81779 A | 4/2010 |
| JP | 2010-288334 A | 12/2010 |
| JP | 2011-244619 A | 12/2011 |

* cited by examiner

SWITCHING POWER SUPPLY CIRCUIT AND LED ILLUMINATION DEVICE

TECHNICAL FIELD

The present invention relates to a switching power supply circuit.

BACKGROUND ART

Conventionally, in the field of switching power supply circuits, there has been developed a technique for making constant a output current with respect to a load variation. As such a technique, for example, Patent Document 1 discloses a technique of detecting a time in which a secondary current flows through a transformer and making constant a ratio of the time to a switching cycle, namely, an on-duty ratio of the secondary current.

A switching power supply circuit disclosed in Patent Document 1 (FIG. 1 of Patent Document 1) is a flyback type switching power supply circuit that has a semiconductor device 100, a transformer 110, diodes 121 and 141, capacitors 122 and 142, and resistors 151 and 152, and in which a predetermined direct current output voltage V0 is generated from a direct current input voltage VIN and supplied to a load 130. The transformer 110 includes a primary coil 111, a secondary coil 112, and an auxiliary coil 113.

In the semiconductor device 100, a switching element 1, a drain current detection circuit 2, a drain current restriction circuit 3, an error amplifier 4, a PFM (pulse frequency modulation) control circuit 5, a secondary current on-period detection circuit 6, a secondary current detection delay time correction circuit 7, a secondary current on-duty control circuit 8, a clock signal selection circuit 9, a flip-flop circuit 10, a NAND circuit 11, a gate driver 12, an on-time blanking pulse generation circuit 13, an AND circuit 14, and a regulator 15 are integrated.

The secondary current on-period detection circuit 6 (FIG. 2 of Patent Document 1) includes one-pulse signal generation circuits 21 and 23, a comparator 22, and a flip-flop circuit 24. The secondary current detection delay time correction circuit 7 includes a constant current source 31, a capacitor 32, an inverter 33, and a switch 34. The secondary current on-duty control circuit 8 includes switches 41 and 42, a capacitor 43, a constant current source 44, N-channel type MOS (metal oxide semiconductor) field-effect transistors 45 and 46, a comparator 47, a reference voltage source 48, an AND circuit 49, and a one-pulse signal generation circuit 50.

FIG. 3 of Patent Document 1 illustrates a timing chart showing a voltage waveform and a current waveform at various portions of the switching power supply circuit. This timing chart depicts an auxiliary coil voltage VTR obtained by dividing a voltage appearing at one end of the auxiliary coil 113, a primary current Ids that flows through the switching element 1, and a secondary current I2$p$ that flows through the secondary coil 112.

Herein, it is assumed that T1 denotes a first period during which the secondary current I2$p$ flows, T2 denotes a second period during which the secondary current I2$p$ does not flow, T3 denotes a third period that is a combination of the first period T1 and the second period T2, Ipk1 denotes a peak value of the primary current Ids, and Ipk2 denotes a peak value of the secondary current I2$p$.

An average output current Iout supplied from the switching power supply circuit to the load 130 is an average value of the secondary current I2$p$. An average value of the secondary current I2$p$ in the first period T1 is one-half the peak value Ipk2 of the secondary current I2$p$. An average value of the secondary current I2$p$ in the third period T3 is a value obtained by multiplying the average value of the secondary current I2$p$ in the first period T1 by an on-duty ratio of the secondary current. Thus, where a number of winding turns of the primary coil 111 is denoted as N1 and a number of winding turns of the secondary coil 112 as N2, the average output current Iout is expressed by an equation (1) below.

$$Iout = (1/2) \times (N1/N2) \times (T1/T3) \times Ipk1 \quad (1)$$

In such a conventional switching power supply circuit, in the above equation (1), while the peak current Ipk1 of the primary current Ids is made constant by using the drain current restriction circuit 3, the on-duty ratio (T1/T3) of the secondary current is made constant by using the secondary current on-duty ratio control circuit 8 so that the average output current Iout is controlled to be constant.

LIST OF CITATIONS

Patent Literature

Patent Document 1: JP-A-2009-11073

SUMMARY OF THE INVENTION

Technical Problem

By the way, in these days of growing awareness of energy saving, it has been demanded that switching power supply circuits achieve a reduction in power consumption. Furthermore, nowadays, various types of LED illumination devices using an LED load as a load of a switching power supply circuit have been proposed, and such LED illumination devices have been demanded to have a dimming function for fulfilling the needs to provide some staging effects to life scenes.

In view of the above, the present invention has as its object to provide a switching power supply circuit that, while making constant a current flowing through a load, makes an output current to the load variable based on an external signal, and an LED illumination device including the same.

Solution to the Problem

In order to achieve the above-described object, the present invention provides a switching power supply circuit of a flyback type provided with a transformer that includes a primary coil and a secondary coil and a switching element that is connected to the primary coil. The switching power supply circuit includes: a multiplier circuit that performs, with respect to a first value obtained by multiplying an on-duty ratio of a secondary current that flows through the secondary coil by a predetermined first constant, multiplication thereof by a second value obtained by multiplying a peak value of a primary current that flows through the primary coil by a predetermined second constant; and a switching control circuit that performs switching control of the switching element so that a result of the multiplication by the multiplier circuit is equal to a third value obtained by multiplying a reference voltage by a predetermined third constant. In this configuration, at least any one of the first constant, the second constant, and the third constant is variable based on an external signal.

Furthermore, the above-described configuration may be such that a digital signal representing the first value and an analogue signal representing the second value are inputted to the multiplier circuit, and the multiplier circuit outputs the result of the multiplication in the form of an analogue signal.

Furthermore, any of the above-described configurations may further include: a peak current detection circuit that includes: a current detection circuit that detects the primary current; and a sample-holding circuit that samples a maximum value of an output of the current detection circuit in a conducting period of the switching element, and holds the value thus sampled in a non-conducting period of the switching element. In this configuration, the peak current detection circuit outputs the second value.

Furthermore, this configuration may be such that the peak current detection circuit further includes a buffer circuit that amplifies an output of the sample-holding circuit by a predetermined amplification factor.

Furthermore, this configuration may be such that the amplification factor of the buffer circuit is variable based on the external signal.

Furthermore, any of the above-described configurations may be such that the current detection circuit detects a value proportional to the secondary current.

Furthermore, any of the above-described configurations may be such that the transformer further includes an auxiliary coil that is provided on a side of the first coil, and a secondary current on-period detection circuit is provided that detects, based on a voltage generated at the auxiliary coil, an on-period of the secondary current and also detects the on-duty ratio of the secondary current.

Furthermore, this configuration may be such that the secondary current on-period detection circuit includes a waveform shaping circuit to which a voltage generated at the auxiliary coil is inputted and that compares the voltage with the reference voltage and outputs a digital signal having a high level and a low level.

Furthermore, any of the above-described configurations may further include: a semiconductor device that includes the switching control circuit; and a power supply voltage generation circuit that, based on a voltage generated at the auxiliary coil, generates a power supply voltage of the semiconductor device.

Furthermore, any of the above-described configurations may further include: an OR circuit to which a digital signal representing the on-duty ratio of the secondary current and the external signal that is a PWM signal are inputted and that outputs the first value.

Furthermore, any of the above-described configurations may further include: an AND circuit to which a digital signal representing the on-duty ratio of the secondary current and the external signal that is a PWM signal are inputted and that outputs the first value.

Furthermore, any of the above-described configurations may further include: an amplifier circuit that amplifies the reference voltage by an amplification factor variable based on the external signal and outputs the third value.

Furthermore, an LED illumination device of the present invention includes: the switching power supply circuit having any of the above-described configurations; and an LED load that is connected to an output side of the switching power supply circuit.

Advantageous Effects of the Invention

According to the present invention, while a current flowing through a load is made constant, an output current to the load is made variable based on an external signal.

DESCRIPTION OF EMBODIMENTS

With reference to the appended drawings, the following describes one embodiment of the present invention. In the following description, an LED illumination device using an LED load as a load of a switching power supply circuit is used as one example.

<Regarding Overall Configuration>

Figure 1:
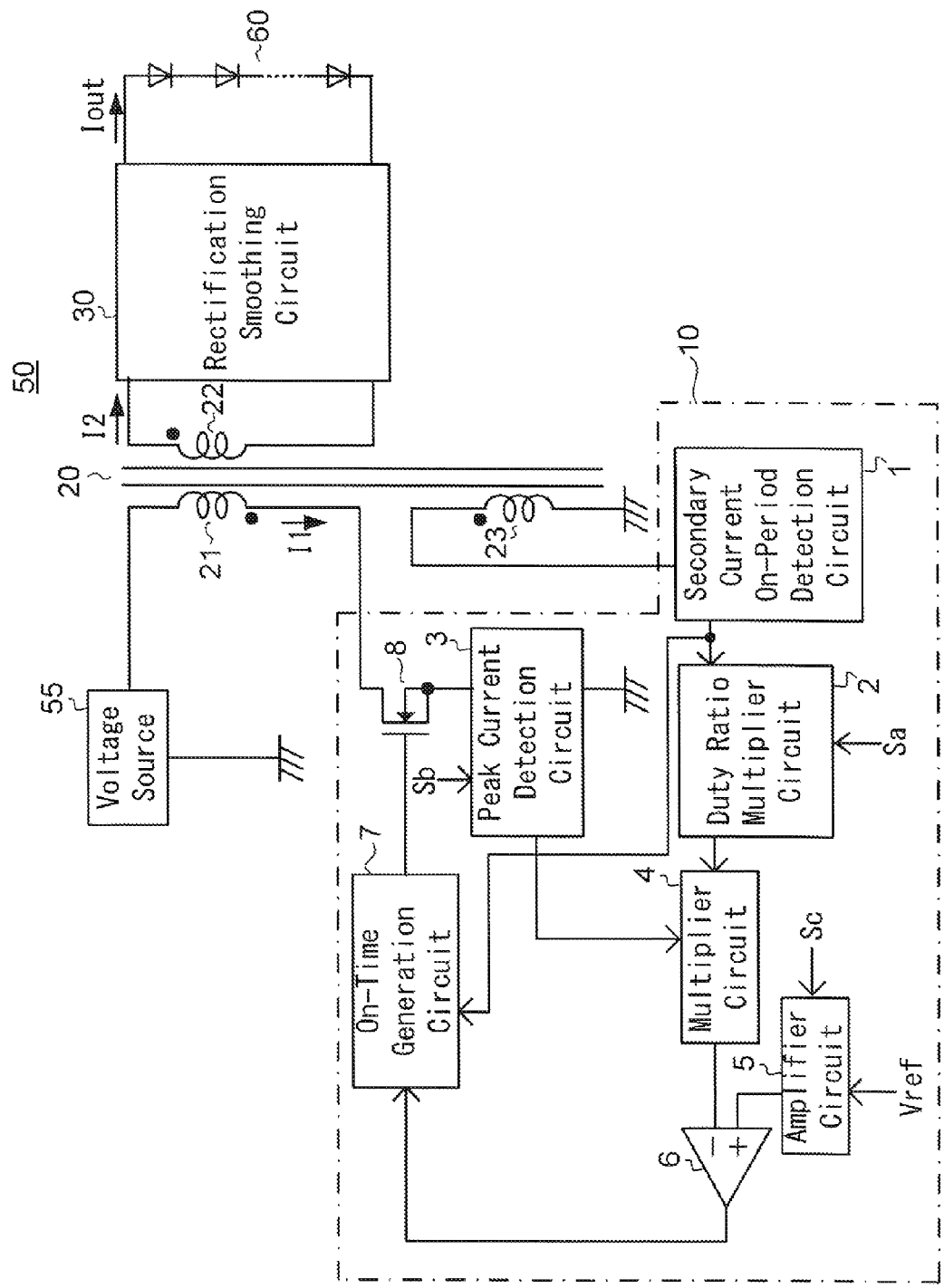
[FIG. 1] is a structural view of a switching power supply circuit according to one embodiment of the present invention.

FIG. 1 shows a configuration of a switching power supply circuit according to one embodiment of the present invention. A switching power supply circuit 50 shown in FIG. 1 is a converter of a so-called flyback type and includes a semiconductor device 10 for the switching power supply circuit 50, a transformer 20, and a rectification smoothing circuit 30. An LED illumination device is composed of the switching power supply circuit 50 and an LED array 60 that is formed by connecting in series a plurality of LEDs and connected to an output side of the rectification smoothing circuit 30.

In the semiconductor device 10, a secondary current on-period detection circuit 1, a duty ratio multiplier circuit 2, a peak current detection circuit 3, a multiplier circuit 4, an amplifier circuit 5, an error amplifier circuit 6, an on-time generation circuit 7, and a switching element 8 are incorporated in an integrated manner.

The transformer 20 includes a primary coil 21, a secondary coil 22, and an auxiliary coil 23. The primary coil 21 and the secondary coil 22 are opposite in polarity to each other. The secondary coil 22 and the auxiliary coil 23 are equal in polarity to each other, and at the auxiliary coil 23, a voltage proportional to a voltage generated at the secondary coil 22 is generated.

A voltage source 55 that is a direct current voltage source or an alternating current voltage source is connected to one end of the primary coil 21. A drain of the switching element 8 formed of an N-channel MOS transistor is connected to the other end of the primary coil 21. Both ends of the secondary coil 22 are connected to an input side of the rectification smoothing circuit 30.

One end of the auxiliary coil 23 is connected to a ground potential, and the other end thereof is connected to an input end of the secondary current on-period detection circuit 1.

Upon switching on of the switching element 8, a primary current I1 flowing through the primary coil 21 gradually increases to cause a magnetic flux to be generated to magnetize a core of the transformer 20, so that energy is accumulated in the core. Then, upon switching off of the switching element 8, the energy is released to cause a secondary current I2 flowing through the secondary coil 22 to rise and then to gradually decrease.

The secondary current on-period detection circuit 1 is a circuit that detects a period during which a secondary current flows (secondary current on-period), and outputs a detection signal to the on-time generation circuit 7.

Furthermore, the secondary current on-period detection circuit 1 is also a circuit that detects a secondary current on-duty ratio expressed by T1/(T1+T2)=T1/T3 where a secondary current on-period is denoted as T1 and a secondary current off-period as T2, and outputs a detection signal obtained by the detection to the duty ratio multiplier circuit 2.

The duty ratio multiplier circuit 2 is a circuit that multiplies by a constant variable depending on an external signal Sa, the secondary current on-duty ratio detected by the secondary current on-period detection circuit 1, and outputs a result of the multiplication to the multiplier circuit 4.

The peak current detection circuit 3 whose input end is connected to a source of the switching element 8 is a circuit that detects a peak of the primary current, and a level of a detection signal it outputs to the multiplier circuit 4 is variable based on an external signal Sb.

The multiplier circuit 4 is a circuit that multiplies the result of the multiplication inputted from the duty ratio multiplier circuit 2 by a result of the detection inputted from the peak current detection circuit 3, and outputs a result of the multiplication to an inverting input terminal of the error amplifier circuit 6. The amplifier circuit 5 amplifies a reference voltage Vref by an amplification factor variable depending on an external signal Sc. An output of the amplifier circuit 5 is inputted to a non-inverting input terminal of the error amplifier circuit 6.

The error amplifier circuit 6 is a circuit that amplifies an error between an output of the multiplier circuit 4 and an output of the amplifier circuit 5. An output of the error amplifier circuit 6 is inputted to the on-time generation circuit 7.

The on-time generation circuit 7 generates a switching control signal by generating, based on the output of the secondary current on-period detection circuit 1, an on-timing of the switching element 8 and by generating, depending on the output of the error amplifier circuit 6, an on-time of the switching element 8, and uses the switching control signal to drive a gate of the switching element 8 so as to perform switching of the switching element 8 (the on-time generation circuit 7 corresponds to a switching control circuit).

Figure 2:
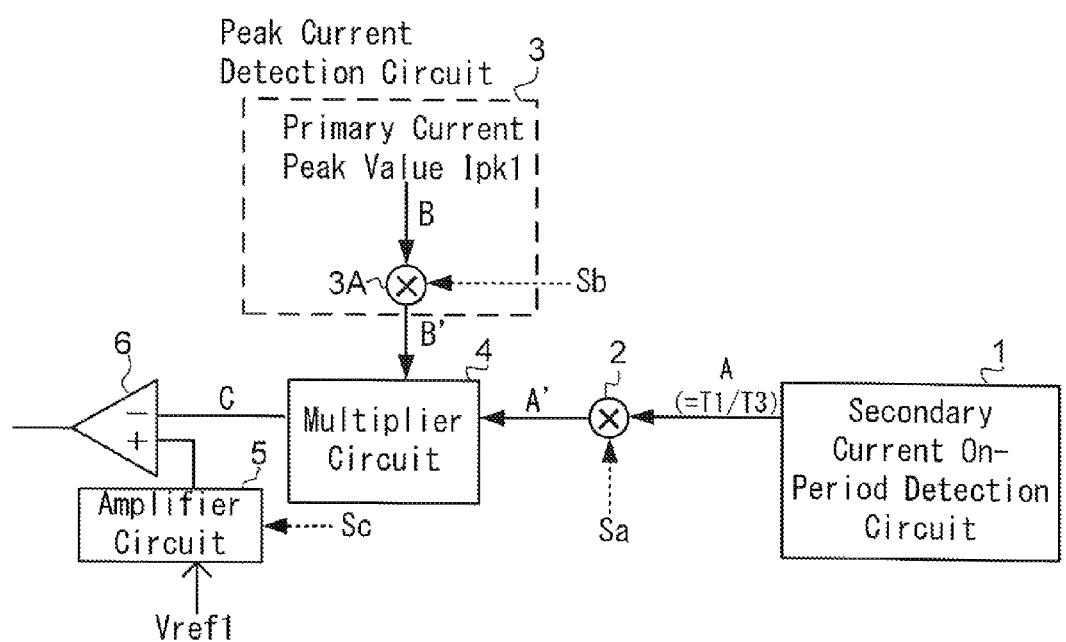
[FIG. 2] is a view showing a configuration of the vicinity of a multiplier circuit in the switching power supply circuit according to the one embodiment of the present invention.

FIG. 2 shows a configuration of the vicinity of the multiplier circuit 4 in the configuration shown in FIG. 1. Where a value of the secondary current on-duty ratio T1/T3 outputted by the secondary current on-period detection circuit 1 is denoted as A, since the duty ratio multiplier circuit 2 multiplies A by a constant a (first constant) variable depending on the external signal Sa, the output of the duty ratio multiplier circuit 2 is expressed by A'=A×a=(T1/T3)×a(A' is a first value).

Furthermore, the peak current detection circuit 3 has a peak current multiplier circuit 3A, and where a value of a primary current peak value Ipk1 is denoted as B, since the peak current multiplier circuit 3A multiplies B by a constant b (second constant) variable depending on the external signal Sb, an output of the peak current multiplier circuit 3A is expressed by B'=B×b=Ipk1×b (B' is a second value).

Accordingly, the output of the multiplier circuit 4 is expressed by C=A'×B'=Ipk1×(T1/T3)×a×b. Furthermore, when the amplifier circuit 5 amplifies the reference voltage Vref1 by an amplification factor 1/c (1/c is a third constant) variable depending on the external signal Sc, the output of the amplifier circuit 5 is expressed by Vref×1/c (third value).

Herein, the on-time generation circuit 7 (FIG. 1) adjusts, depending the output of the error amplifier circuit 6, the on-time of the switching element 8 so that the output of the multiplier circuit 4 and the output of the amplifier circuit 5 are equal to each other, thus controlling the peak of the primary current. Accordingly, under this control, Ipk1×(T1/T3)×a×b=Vref×1/c is given, and thus an equation (2) below is established.

$$Ipk1 \times (T1/T3) = Vref \times 1/(a \times b \times c) \quad (2)$$

Furthermore, an output current Iout supplied from the switching power supply circuit 50 to the LED array 60 as the load is an average value of the secondary current I2. An average value of the secondary current I2 in the secondary current on-period T1 is one-half a peak value Ipk2 of the secondary current I2. An average value of the secondary current I2 in a period T3 that is a sum of the secondary current on-period T1 and the secondary current off-period T2 is a value obtained by multiplying the average value of the secondary current I2 in the secondary current on-period T1 by the secondary current on-duty ratio T1/T3. Accordingly, where a number of winding turns of the primary coil 21 is denoted as N1, and a number of winding turns of the secondary coil 22 as N2, the output current Iout is expressed by an equation (3) below.

$$\begin{aligned} Iout &= (1/2) \times Ipk2 \times (T1/T3) \\ &= (1/2) \times (N1/N2) \times (T1/T3) \times Ipk1 \end{aligned} \quad (3)$$

Thus, based on the equation (2) and the equation (3), $$Iout = (1/2) \times (N1/N2) \times Vref \times 1/(a \times b \times c) \quad (4)$$

is established.

Accordingly, while the output current Iout is made constant, the constants a, b, and c are variable depending on the external signals Sa, Sb, and Sc, respectively, and thus the output current Iout can be made variable based on the external signals. This can achieve a reduction in power consumption and can realize a dimming function of the LED array 60.

As for how the external signals could be outputted, for example, depending on a wireless signal from a remote controller, a microcomputer (not shown) outputs an external signal in a varying form.

<Regarding Configuration of Peak Current Detection Circuit>

Figure 3:
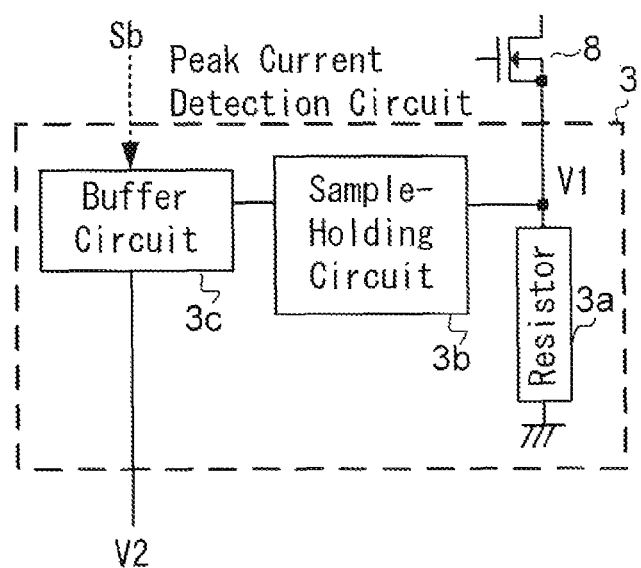
[FIG. 3] is a view showing one configuration example of a peak current detection circuit.

FIG. 3 shows one configuration example of the peak current detection circuit 3. A peak current detection circuit 3 shown in FIG. 3 includes a current detection resistor 3a whose one end is connected to a source of the switching element 8 and whose other end is connected to a ground potential, a sample-holding circuit 3b whose input end is connected to a connection point between the switching element 8 and the current detection resistor 3a, and a buffer circuit 3c whose input end is connected to an output end of the sample-holding circuit 3b In a conducting period of the switching element 8, the sample-holding circuit 3b samples a peak current value of the primary current I1, and in a non-conducting period of the switching element 8, it holds the peak current value. Herein, since a primary current detection voltage V1=the primary current I1×a resistance value R1 of the current detection resistor 3a is established, the peak current value of the primary current I1 is sampled as V1=Ipk1×R1. Since Ipk1 is obtained by multiplying a secondary current peak value by a ratio of a number of wiring turns, V1 has a value proportional to the secondary current peak value.

Furthermore, an output result of the sample-holding circuit 3b is amplified by the buffer circuit 3c and then outputted. An amplification factor Ap of the buffer circuit 3c is variable depending on the external signal Sb.

Accordingly, an output voltage V2 of the buffer circuit 3c (=the output B' of the peak current detection circuit 3 (FIG. 2)) is expressed by V2=Ipk1×R1×Ap, and a constant b by which multiplication is performed at the peak current multiplier circuit 3A in FIG. 2 is expressed by b=R1×Ap. That is, the constant b is variable based on the external signal Sb.

Figure 4:
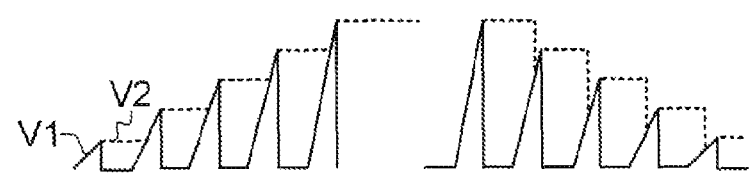
[FIG. 4] is a view showing a waveform example of voltages at various portions in the peak current detection circuit.

FIG. 4 shows a wavelength example of the primary current detection voltage V1 and the output voltage V2 of the buffer circuit 3c in a case where the amplification factor Ap=1.

<Regarding Configuration of Secondary Current On-period Detection Circuit>

Figure 5:
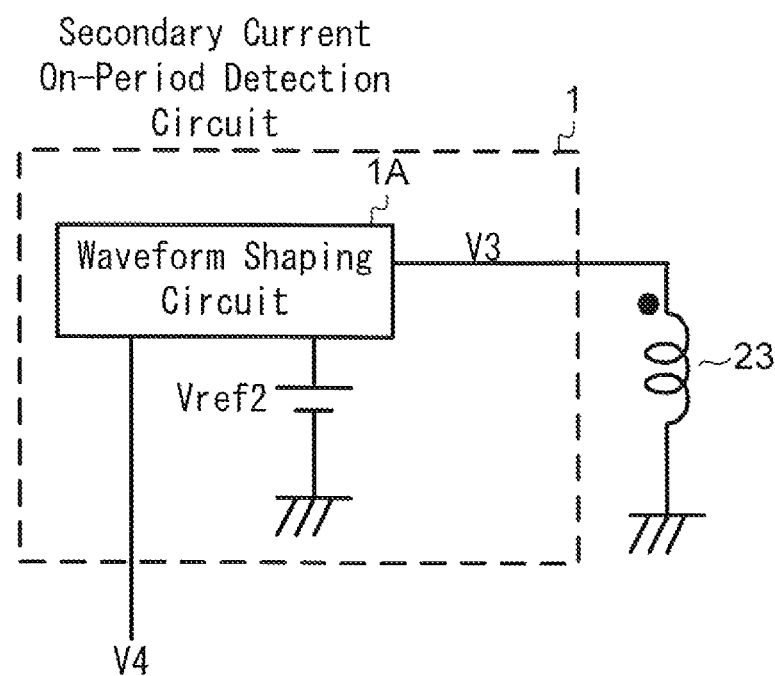
[FIG. 5] is a view showing one configuration example of a secondary current on-period detection circuit.

FIG. 5 shows one configuration example of the secondary current on-period detection circuit 1. A secondary current on-period detection circuit 1 shown in FIG. 5 includes a waveform shaping circuit 1A whose input end is connected to one end of the auxiliary coil 23 and a reference voltage source Vref2. The waveform shaping circuit 1A performs waveform shaping of a voltage generated at the auxiliary coil 23 and outputs the voltage.

Figure 6:
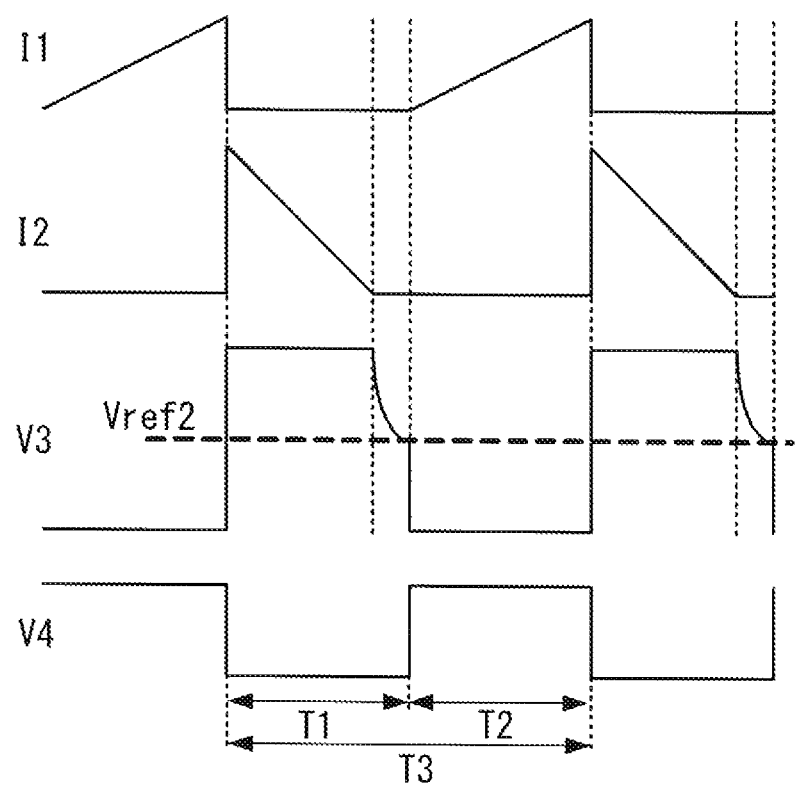
[FIG. 6] is a view showing a waveform example including voltages at various portions in secondary current on-period detection circuit.

FIG. 6 shows a waveform example of the primary current I1, the secondary current I2, an auxiliary coil voltage V3, and an output voltage V4 of the waveform shaping circuit 1A. Upon switching on of the switching element 8, the primary current I1 gradually increases, and upon switching off of the switching element 8, the secondary current I2 rises and gradually decreases. In a period during which the secondary current I2 flows, the auxiliary coil voltage V3 is generated. Herein, where a secondary side voltage is denoted as Vout, the number of winding turns of the secondary coil as N2, and a number of winding turns of the auxiliary coil as N3, V3=Vout×N3/N2 is established.

In the period during which the secondary current I2 flows and thus the auxiliary coil voltage V3 is generated, the auxiliary coil voltage V3 has a value not lower than a reference voltage Vref2, and the waveform shaping circuit 1A, as long as it keeps detecting this, outputs the output voltage V4 at a low level. Then, upon the secondary current I2 becoming zero, the auxiliary coil voltage V3 starts to drop to fall below the reference voltage Vref2. Upon detecting this, the waveform shaping circuit 1A outputs the output voltage V4 at a high level.

The on-time generation circuit 7 (FIG. 1) determines, as a timing for switching on the switching element 8, a timing at which the output voltage V4 of the secondary current on-period detection circuit 1 rises from the low level to the high level.

Furthermore, in a period during which the output voltage V4 of the waveform shaping circuit 1A is at the low level, a secondary current on-period T1 occurs, and in a period during which it is at the high level, a secondary current off-period T2 occurs (See FIG. 6). The output voltage V4, therefore, is regarded also as a detection signal of the secondary current on-duty ratio T1/T3 and is outputted to the duty ratio multiplier circuit 2 (FIG. 1).

Figure 7:
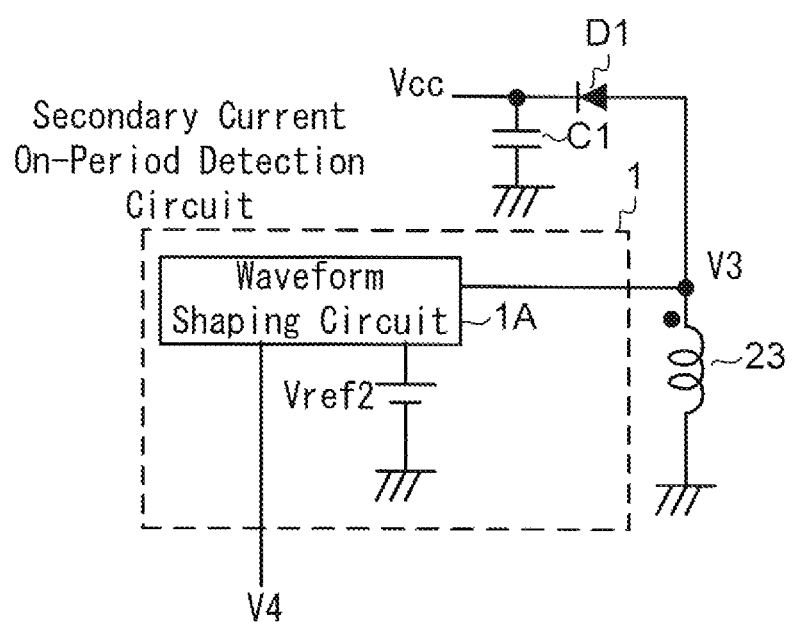
[FIG. 7] is a view showing an example of generating a power supply voltage from an auxiliary coil.

A configuration may be adopted in which, as shown in FIG. 7, an anode of a rectifying diode D1 is connected to one end of the auxiliary coil 23, and a cathode of the diode D1 and one end of a smoothing capacitor C1 are connected in common. In this configuration, based on a voltage generated at the auxiliary coil 23, a power supply voltage Vcc for the semiconductor device 10 (FIG. 1) is generated at a common connection point between the cathode of the diode D1 and the one end of the capacitor C1 (a power supply voltage generation circuit is composed of the diode D1 and the capacitor C1).

In a case where the voltage source 55 (FIG. 1) has a voltage value expressed by the voltage value>the power supply voltage Vcc, when current consumption is constant, the higher the voltage value of the voltage source 55, the more a power loss is increased. According to the above-described configuration, by the auxiliary coil 23, the power supply voltage Vcc can be adjusted to a more appropriate voltage value, and thus the power loss can be suppressed as much as possible.

<Regarding Configuration of Multiplier Circuit>

Figure 8:
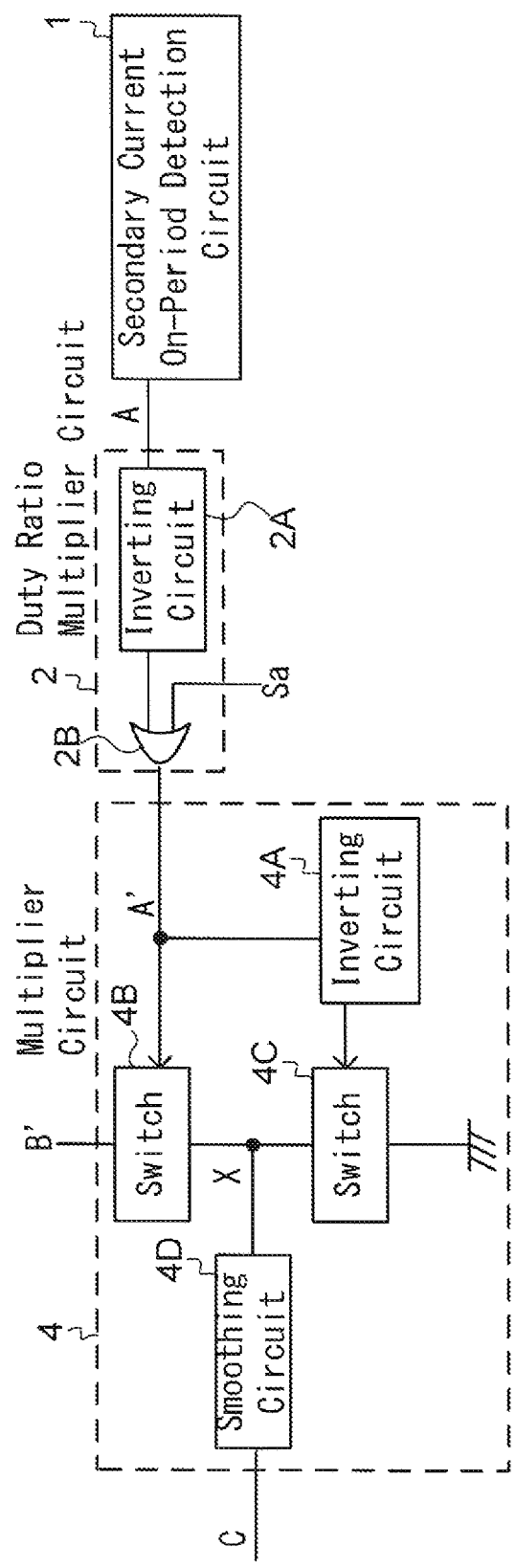
[FIG. 8] is a view showing one configuration example of a multiplier circuit and a duty ratio multiplier circuit.

FIG. 8 shows one configuration example of the multiplier circuit 4 and the duty ratio multiplier circuit 2. The duty ratio multiplier circuit 2 includes an inverting circuit 2A and an OR circuit 2B. The multiplier circuit 4 includes an inverting circuit 4A, a switch 4B, a switch 4C, and a smoothing circuit 4D.

The output of the secondary current on-period detection circuit 1 is inverted by the inverting circuit 2A, and a result of the inversion and the external signal Sa that is a PWM (pulse width modulation) signal are inputted to the OR circuit 2B. An output of the OR circuit 2B causes switching of the switch 4B, and an inverted output obtained by inverting the output of the OR circuit 2B by the inverting circuit 4A causes switching of the switch 4C. An output end of the peak current detection circuit 3 is connected to one end of the switch 4B, with the switch 4B and the switch 4C being connected in series, and one end of the switch 4C is connected to a ground potential. An input end of the smoothing circuit 4D is connected to a connection point between the switch 4B and the switch 4C, and an output end of the smoothing circuit 4D is connected, as an output end of the multiplier circuit 4, to the inverting input terminal of the error amplifier circuit 6 (FIG. 1).

Figure 9:
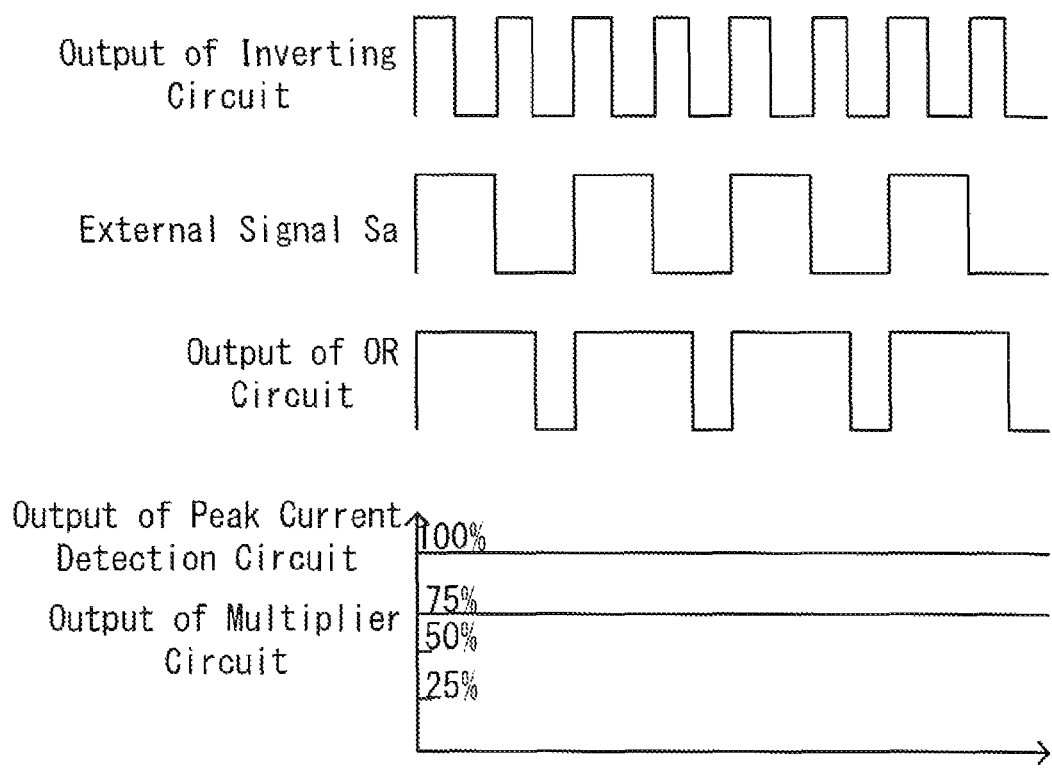
[FIG. 9] is a view showing a waveform example of signals at various portions in FIG. 8.

FIG. 9 shows a wavelength example of signals at various portions in the configuration shown in FIG. 8. The output of the secondary current on-period detection circuit I is, as described earlier, a digital signal (pulse signal) having a low level and a high level, and an uppermost one of waveforms shown in FIG. 9 is that of an output of the inverting circuit 2A in a case where the secondary current on-duty ratio T1/T3 is 50%.

Furthermore, the external signal Sa shown in FIG. 9 represents a waveform in a case where a duty ratio thereof is set to 50%. Based on this, as shown in FIG. 9, the output of the OR circuit 2B has a duty ratio of 75%.

Where the secondary current on-duty ratio T1/T3=A, and the duty ratio of the external signal Sa that is a PWM signal is denoted as γ, a duty ratio A' of the output of the OR circuit 2B is expressed by an equation (5) below.

$$A' = A + \gamma - A \times \gamma \quad (5)$$

Based on the equation (5), A'=A×(A+γ−A×γ)/A is established, and thus the constant a by which multiplication is performed at the duty ratio multiplier circuit 2 in FIG. 2 is expressed by a=(A+γ−A×γ)/A. That is, the constant a is variable based on the external signal Sa. The constant a in the above equation (4) is expressed by a≥100%, and there is, therefore, a tendency that the output current Iout decreases.

The output of the OR circuit 2B is a digital signal that causes the switch 4C to be non-conducting when the switch 4B is conducting and the switch 4C to be conducting when the switch 4B is non-conducting. Thus, when the switch 4B is conducting, a signal X at the connection point between the switches 4B and 4C is expressed by X=B' (B' is an output of the peak current detection circuit 3 and has an analogue value), and when the switch 4C is conducting, X=0 is established. Then, the signal X is smoothed by the smoothing circuit 4D, and an output C of the smoothing circuit 4D is expressed by C=A'×B'.

In a case of FIG. 9, since the duty ratio A' of the output of the OR circuit 2B is expressed by A'=75%, the output C of the smoothing circuit 4D, namely, the output of the multiplier circuit 4 is 75% of the output of the peak current detection circuit 3.

Figure 10:
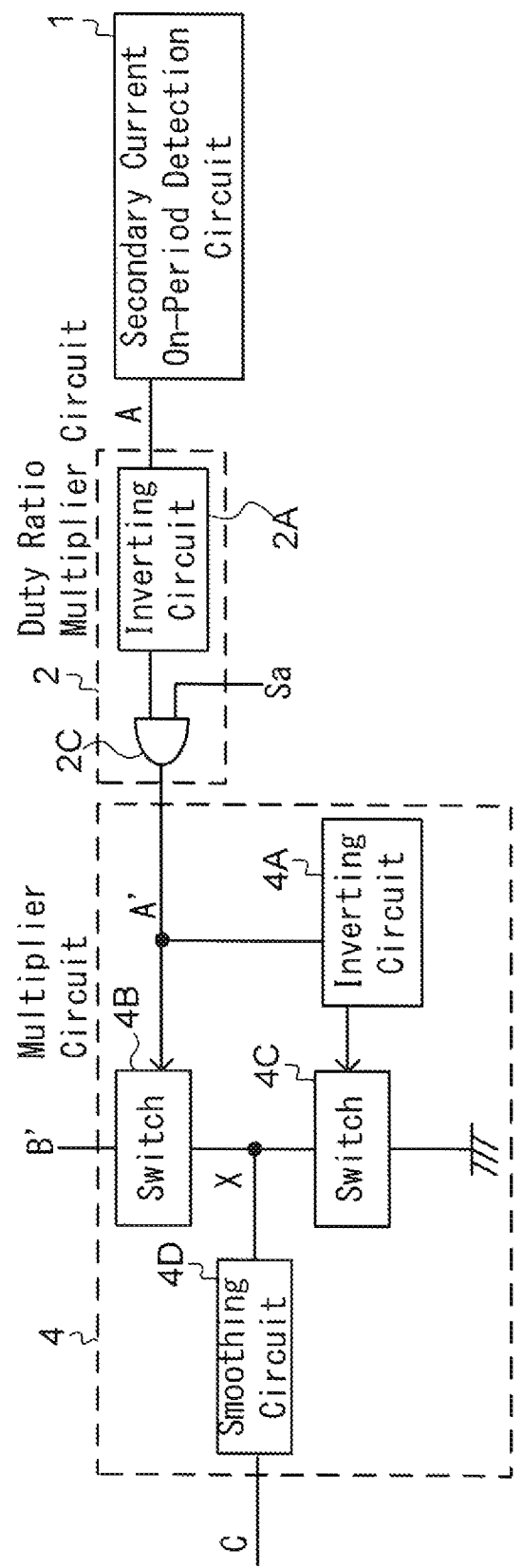
[FIG. 10] is a view showing one configuration example of a multiplier circuit and a duty ratio multiplier circuit.

Next, FIG. 10 shows another configuration example of the duty ratio multiplier circuit 2. A configuration shown in FIG. 10 is different from the earlier described configuration shown in FIG. 8 in that, in a duty ratio multiplier circuit 2, an AND circuit 2C is used instead of the OR circuit 2B.

In a case of this configuration, a duty ratio A' of an output of the AND circuit 2C is expressed by an equation (6) below.

$$A' = A \times \gamma \quad (6)$$

Based on the equation (6), the constant a by which multiplication is performed at the duty ratio multiplier circuit 2 in FIG. 2 is expressed by a=γ. That is, the constant a is variable based on the external signal Sa. The constant a in the above equation (4) is expressed by 0%≤a≤100%, and there is, therefore, a tendency that the output current Iout increases.

Figure 11:
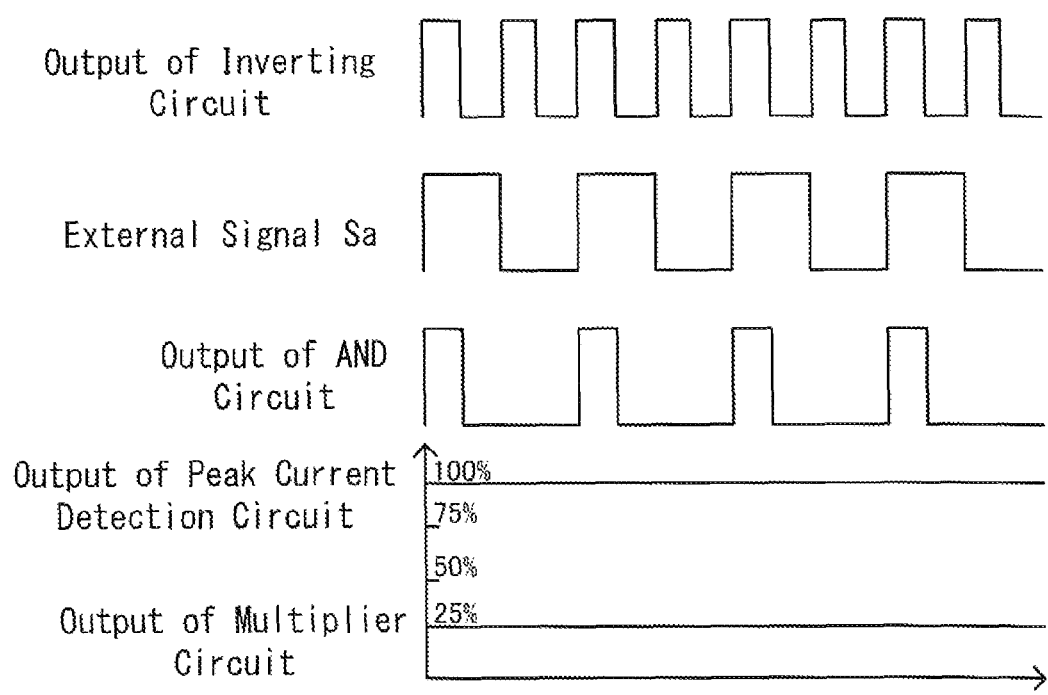
[FIG. 11] is a view showing a waveform example of signals at various portions in FIG. 10.

For example, FIG. 11 shows waveforms of signals at various portions shown in FIG. 10 in a case where the secondary current on-duty ratio is 50% and the duty ratio of the external signal Sa is 50%. In this case, the output of the AND circuit 2C has a duty ratio of 25%. Further, the output of the multiplier circuit 4 is 25% of the output of the peak current detection circuit 3.

<Other Modification Examples>

The embodiment of the present invention described in the foregoing can be variously modified without departing from the spirit of the present invention.

For example, while in the foregoing embodiment, values of the constants a, b, and 1/c by which multiplications is performed are variable based on the external signals Sa, Sb, and Sc, respectively, it is only required that at least any one of these constants be variable.

For example, the amplification factor of the buffer circuit 3c (FIG. 3) in the peak current detection circuit 3 may be fixed. Furthermore, a configuration may be adopted in which the buffer circuit 3c is not provided (this case namely means that constant b=R1).

Furthermore, for example, the amplification factor of the amplifier circuit 5 (FIG. 1) may be fixed. Furthermore, a configuration also may be adopted in which the amplifier circuit 5 is not provided, and the reference voltage Vref1 is inputted directly to the error amplifier circuit 6 (this case is namely equivalent to the constant 1/c=1).

Furthermore, for example, the duty ratio of the external signal Sa to be inputted to the duty ratio multiplier circuit 2 may be fixed.

Figure 12:
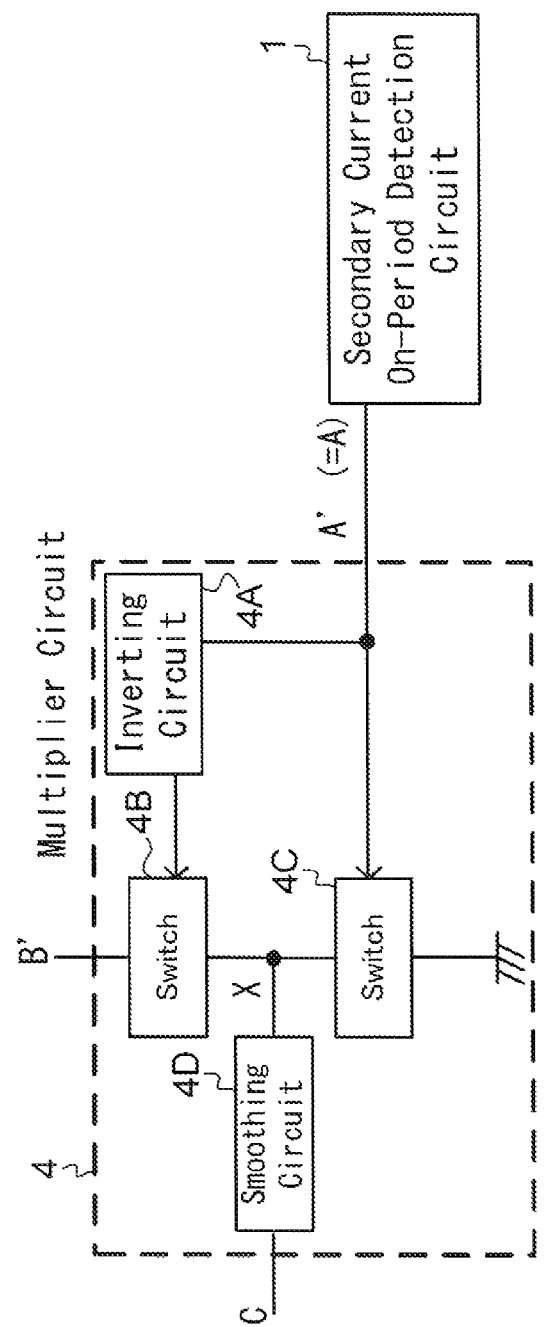
[FIG. 12] is a view showing one example in which a duty ratio multiplier circuit is omitted.

Furthermore, a configuration also may be adopted in which, as shown in FIG. 12, the duty ratio multiplier circuit 2 is not provided, so that the output of the secondary current on-period detection circuit 1 is inputted to the switch 4B via the inverting circuit 4A, and the output of the secondary current on-period detection circuit 1 is inputted directly to the switch 4C. This case is namely equivalent to the constant a=1.

Figure 13:
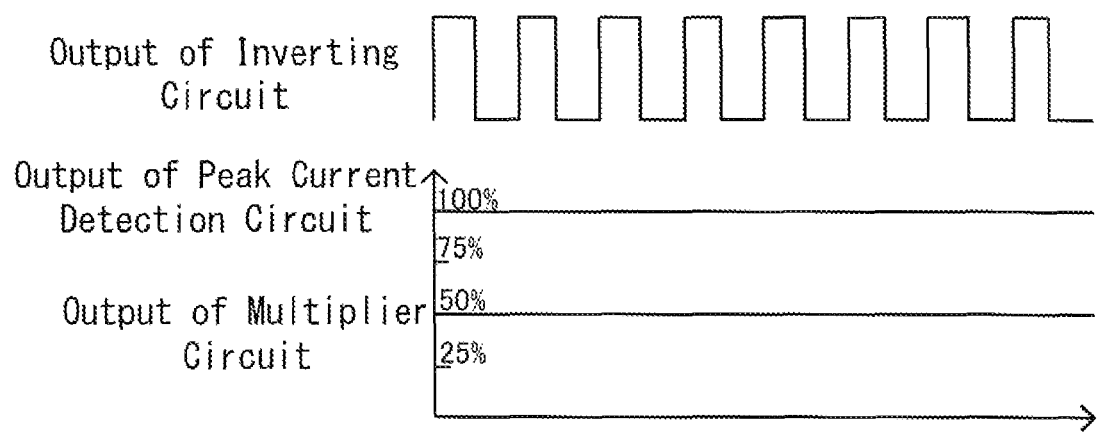
[FIG. 13] is a view showing a waveform example of signals at various portions in FIG. 12.

FIG. 13 shows signal waveforms at various portions in a configuration shown in FIG. 12 in a case where the secondary current on-duty ratio A is 50%. In this case, the output of the multiplier circuit 4 is 50% of the output B' of the peak current detection circuit.

Furthermore, a configuration also may be adopted in which instead of the peak current detection circuit 3, a circuit similar in configuration to the peak current detection circuit 3 shown in FIG. 3 is provided, and one end of the secondary coil 22, instead of the switching element 8, is connected to a current detection resistor 3a of that circuit. In this case, V2=Ipk2×R1×Ap is given, and since herein, Ipk2=Ipk1×(N1/N2), V2=Ipk1×(N1/N2)×R1×Ap is established. Thus, the constant b=(N1/N2)×R1×Ap is obtained.

Specific examples of an LED illumination device according to the present invention include an LED light bulb, a ceiling light, and a straight-tube type light.

LIST OF REFERENCE SYMBOLS 1 secondary current on-period detection circuit
2 duty ratio multiplier circuit
3 peak current detection circuit
4 multiplier circuit
5 amplifier circuit
6 error amplifier circuit
7 on-time generation circuit
8 switching element
10 semiconductor device
20 transformer
21 primary coil
22 secondary coil
23 auxiliary coil
30 rectification smoothing circuit
55 voltage source
60 LED array

The invention claimed is:

1. A switching power supply circuit of a flyback type provided with a transformer that includes a primary coil and a secondary coil and a switching element that is connected to the primary coil, comprising:
a multiplier circuit that performs, with respect to a first value obtained by multiplying an on-duty ratio of a secondary current that flows through the secondary coil by a predetermined first constant, multiplication thereof by a second value obtained by multiplying a peak value of a primary current that flows through the primary coil by a predetermined second constant; and
a switching control circuit that performs switching control of the switching element so that a result of the multiplication by the multiplier circuit is equal to a third value obtained by multiplying a reference voltage by a predetermined third constant,
wherein
at least any one of the first constant, the second constant, and the third constant is variable based on an external signal.

2. The switching power supply circuit according to claim 1, wherein
a digital signal representing the first value and an analogue signal representing the second value are inputted to the multiplier circuit, and the multiplier circuit outputs the result of the multiplication in a form of an analogue signal.

3. The switching power supply circuit according to claim 2, further comprising:
a peak current detection circuit that includes:
a current detection circuit that detects the primary current; and
a sample-holding circuit that samples a maximum value of an output of the current detection circuit in a conducting period of the switching element, and holds the value thus sampled in a non-conducting period of the switching element,
wherein the peak current detection circuit outputs the second value.

4. The switching power supply circuit according to claim 2, wherein
the transformer further includes an auxiliary coil that is provided on a side of the first coil, and
a secondary current on-period detection circuit is provided that detects, based on a voltage generated at the auxiliary coil, an on-period of the secondary current and also detects the on-duty ratio of the secondary current.

5. The switching power supply circuit according to claim 1, further comprising:
a peak current detection circuit that includes:
a current detection circuit that detects the primary current; and
a sample-holding circuit that samples a maximum value of an output of the current detection circuit in a conducting period of the switching element, and holds the value thus sampled in a non-conducting period of the switching element,
wherein the peak current detection circuit outputs the second value.

6. The switching power supply circuit according to claim 5, wherein
the peak current detection circuit further includes a buffer circuit that amplifies an output of the sample-holding circuit by a predetermined amplification factor.

7. The switching power supply circuit according to claim 6, wherein
the amplification factor of the buffer circuit is variable based on the external signal.

8. The switching power supply circuit according to claim 7, wherein
the current detection circuit detects a value proportional to the secondary current.

9. The switching power supply circuit according to claim 7, wherein
the transformer further includes an auxiliary coil that is provided on a side of the first coil, and
a secondary current on-period detection circuit is provided that detects, based on a voltage generated at the auxiliary coil, an on-period of the secondary current and also detects the on-duty ratio of the secondary current.

10. The switching power supply circuit according to claim 6, wherein
the current detection circuit detects a value proportional to the secondary current.

11. The switching power supply circuit according to claim 6, wherein
the transformer further includes an auxiliary coil that is provided on a side of the first coil, and
a secondary current on-period detection circuit is provided that detects, based on a voltage generated at the auxiliary coil, an on-period of the secondary current and also detects the on-duty ratio of the secondary current.

12. The switching power supply circuit according to claim 5, wherein
the current detection circuit detects a value proportional to the secondary current.

13. The switching power supply circuit according to claim 5, wherein
the transformer further includes an auxiliary coil that is provided on a side of the first coil, and
a secondary current on-period detection circuit is provided that detects, based on a voltage generated at the auxiliary coil, an on-period of the secondary current and also detects the on-duty ratio of the secondary current.

14. The switching power supply circuit according to claim 1, wherein
the transformer further includes an auxiliary coil that is provided on a side of the first coil, and
a secondary current on-period detection circuit is provided that detects, based on a voltage generated at the auxiliary coil, an on-period of the secondary current and also detects the on-duty ratio of the secondary current.

15. The switching power supply circuit according to claim 14, wherein
the secondary current on-period detection circuit includes a waveform shaping circuit to which a voltage generated at the auxiliary coil is inputted and that compares the voltage with the reference voltage and outputs a digital signal having a high level and a low level.

16. The switching power supply circuit according to claim 14, further comprising:
a semiconductor device that includes the switching control circuit; and
a power supply voltage generation circuit that, based on a voltage generated at the auxiliary coil, generates a power supply voltage of the semiconductor device.

17. The switching power supply circuit according to claim 1, further comprising:
an OR circuit to which a digital signal representing the on-duty ratio of the secondary current and the external signal that is a PWM signal are inputted and that outputs the first value.

18. The switching power supply circuit according to claim 1, further comprising:
an AND circuit to which a digital signal representing the on-duty ratio of the secondary current and the external signal that is a PWM signal are inputted and that outputs the first value.

19. The switching power supply circuit according to claim 1, further comprising:
an amplifier circuit that amplifies the reference voltage by an amplification factor variable based on the external signal and outputs the third value.

20. An LED illumination device, comprising:
the switching power supply circuit according to any one of claims 1; and
an LED load that is connected to an output side of the switching power supply circuit.

* * * * *